(12) United States Patent
Kalfon et al.

(10) Patent No.: US 8,798,010 B2
(45) Date of Patent: Aug. 5, 2014

(54) TABLE-BASED RESOURCE MAPPING FOR DOWNLINK CONTROL CHANNELS IN A WIRELESS SYSTEM BASE STATION

(75) Inventors: Shai Kalfon, Hod Hasharon (IL); Eran Goldstein, Raanana (IL); Ido Gazit, Haifa (IL); Assaf Pihed, Ness Zionna (IL)

(73) Assignee: LSI Corporation, San Jose, CA (US)

( * ) Notice: Subject to any disclaimer, the term of this patent is extended or adjusted under 35 U.S.C. 154(b) by 422 days.

(21) Appl. No.: 13/362,072

(22) Filed: Jan. 31, 2012

(65) Prior Publication Data

US 2013/0195021 A1    Aug. 1, 2013

(51) Int. Cl.
*H04B 7/216*    (2006.01)
*H04J 11/00*    (2006.01)
*H04L 12/40*    (2006.01)

(52) U.S. Cl.
USPC ........... 370/335; 370/208; 370/282; 370/436; 370/480; 375/362

(58) Field of Classification Search
USPC ......... 370/206, 207, 208, 282, 319, 335, 436, 370/441, 479, 480; 375/145, 149, 349, 362
See application file for complete search history.

(56) References Cited

U.S. PATENT DOCUMENTS

| | | | |
|---|---|---|---|
| 7,869,415 B2 | 1/2011 | Lee et al. | |
| 8,649,346 B2* | 2/2014 | Park | 370/329 |
| 2009/0147743 A1 | 6/2009 | Parkvall et al. | |
| 2009/0245187 A1 | 10/2009 | Nam et al. | |
| 2010/0034312 A1 | 2/2010 | Muharemovic et al. | |
| 2010/0332937 A1 | 12/2010 | Dai et al. | |
| 2011/0007695 A1 | 1/2011 | Choi et al. | |
| 2011/0044391 A1* | 2/2011 | Ji et al. | 375/260 |
| 2011/0075626 A1* | 3/2011 | Lee et al. | 370/329 |

(Continued)

FOREIGN PATENT DOCUMENTS

| | | |
|---|---|---|
| EP | 2071790 A2 | 6/2009 |
| EP | 2093924 A2 | 8/2009 |

OTHER PUBLICATIONS

3GPP, "3rd Generation Partnership Project; Technical Specification Group Radio Access Network; Evolved Universal Terrestrial Radio Access (E-UTRA); Physical Channels and Modulation (Release 8)," 3GPP TS 36.211 V8.9.0, Dec. 2009, 83 pages.

(Continued)

*Primary Examiner* — Benjamin H Elliott, IV
(74) *Attorney, Agent, or Firm* — Ryan, Mason & Lewis, LLP

(57) ABSTRACT

A transmitter comprises resource mapping circuitry configured to map symbols from multiple control channels to transmission symbols in a base station of a wireless system. The resource mapping circuitry comprises a table-based mapper configured to receive the control channel symbols and to map those symbols to the transmission symbols utilizing at least a selected one of a plurality of tables providing respective distinct mappings between the control channel symbols and the transmission symbols. For example, each of the transmission symbols may comprise a plurality of resource groups and the tables may specify distinct mappings of the control channels symbols to resource groups for different sets of possible base station parameter values. In one embodiment, the control channels comprise a physical control format indicator channel (PCFICH), a physical downlink control channel (PDCCH), and a physical hybrid ARQ indicator channel (PHICH) of an LTE cellular system.

22 Claims, 4 Drawing Sheets

(56) References Cited

U.S. PATENT DOCUMENTS

| | | |
|---|---|---|
| 2011/0151910 A1 | 6/2011 | Kim et al. |
| 2011/0176502 A1 | 7/2011 | Chung et al. |
| 2011/0206014 A1 | 8/2011 | Lee et al. |
| 2011/0292900 A1 | 12/2011 | Ahn et al. |
| 2012/0033643 A1* | 2/2012 | Noh et al. ............ 370/335 |
| 2013/0039318 A1* | 2/2013 | Wang ................. 370/329 |
| 2013/0129008 A1* | 5/2013 | Ko et al. ............. 375/295 |
| 2013/0195021 A1* | 8/2013 | Kalfon et al. ........ 370/329 |

OTHER PUBLICATIONS

Hyung G. Myung Rgnyung, "Technical Overview of 3GPP LTE," May 2008, 53 pages.

3GPP, "3rd Generation Partnership Project; Technical Specification Group Radio Access Network; Evolved Universal Terrestrial Radio Access (E-UTRA); Physical Channels and Modulation (Release 9)," 3GPP TS 36.211 V9.1.0, Mar. 2010, 85 pages.

E. Dahlman et al., "HSPA and LTE for Mobile Broadband," 3G Evolution, 2nd Edition, http://books.google.com/books?hl=en&lr=&id=cmMgp4j23D0C&oi=fnd&pg=PP2&dq=3gpp+lte+physical+hybrid+ARQ+indicator+channel&ots=KCcc2TqtX-&sig=92cQtVeRDM1_XmYKGpYrlYehgek#v=onepage&q&f=false, 2008, p. 337.

U.S. Appl. No. 13/353,664, filed in the name of Gazit et al. Jan. 19, 2012 and entitled "Downlink Indicator Channel Processing in a Wireless System Base Station."

* cited by examiner

TABLE-BASED RESOURCE MAPPING FOR DOWNLINK CONTROL CHANNELS IN A WIRELESS SYSTEM BASE STATION

BACKGROUND

Wireless systems in the cellular context are currently being implemented using fourth generation (4G) standards, These 4G standards include Long Term Evolution (LTE) standards developed by the 3G Partnership Project (3GPP). LTE cellular systems make use of an Internet protocol (IP) based packet core referred to as Evolved Packet Core (EPC). The EPC interconnects multiple base stations within the system. A given base station, also referred to as an evolved Node B (eNB), communicates over an air interface with multiple user terminals. Individual user terminals are also referred to as user equipment (UE).

The air interface between an eNB and UE in an LTE cellular system includes a variety of uplink and downlink channels. See, for example, 3GPP TS 36.211, V9.1.0, 3rd Generation Partnership Project Technical Specification, Group Radio Access Network, Evolved Universal Terrestrial Radio Access (E-UTRA), Physical Channels and Modulation (Release 9), March 2010, which is incorporated by reference herein. These channels include downlink control channels referred to as physical control format indicator channel (PCFICH), physical hybrid automatic repeat request (ARQ) indicator channel (PHICH), and physical downlink control channel (PDCCH).

In conventional LTE systems, symbols from these downlink control channels are mapped to orthogonal frequency division multiplexed (OFDM) symbols for transmission using a resource element mapping process. Each OFDM symbol comprises multiple resource element groups (REGs) each in a particular position. The resource element mapping for the PCFICH, PDCCH and PHICH control channels is a multistage process performed in three consecutive stages, with each stage involving the mapping of PCFICH, PDCCH and PHICH symbols to REG positions of OFDM symbols. First, PCFICH symbols are mapped to REG positions of the OFDM symbols independently of the other two channels. Next, PHICH symbols are mapped to specific REG positions in one or more OFDM symbols in two sub-stages. In the first sub-stage, REG positions not used by the previous stage are identified as free REG positions and numbered from 0 to N-1, and in the second sub-stage the PHICH symbols are mapped to the N free REG positions of the OFDM symbols. Finally, the PDCCH symbols are mapped to selected remaining REG positions of the OFDM symbols. This part of the resource element mapping process generally involves starting from an initial REG position for each OFDM symbol and determining whether or not the position is free. If the REG position is free, PDCCH symbols may be mapped to that position.

The process continues for higher REG positions within the current OFDM symbol and then for REG positions of subsequent OFDM symbols, until all of the PDCCH symbols have been mapped to REG positions within those OFDM symbols.

Additional details regarding these and other conventional PCFICH, PDCCH and PHICH processing operations can be found in respective Sections 6.7, 6.8 and 6.9 of the above-cited 3GPP TS 36.211 document, at pages 54-62.

Determining whether or not a given REG position is free is also referred to herein as occupancy testing of the REG position. The conventional resource element mapping process described above involves frequent occupancy testing at each of multiple stages of the process, which increases the amount of time required to complete the process.

However, LTE system channels such as PCFICH, PDCCH and PHICH are subject to strict latency requirements. Meeting these latency requirements while performing excessive occupancy testing can unduly increase the memory and computational requirements of the base station, leading to higher costs and increased power consumption.

SUMMARY

Illustrative embodiments of the invention provide improved resource mapping of multiple control channels, including PCFICH, PDCCH, PHICH or other types of control channels, to transmission symbols in a base station of a wireless system, such as an LTE cellular system. For example, one or more such embodiments may be configured to implement table-based resource mapping for downlink physical control channels. The tables may be used to store information characterizing areas of continuous mapping for the PCFICH, PDCCH, PHICH control channels, such that for a given area of continuous mapping, symbols of the corresponding control channel are mapped continuously to REG positions of one or more OFDM symbols. Each of the areas of continuous mapping may be described in one or more tables by information that may include a starting OFDM symbol, a starting REG position in that symbol, and a total number of REG positions to be mapped for that area of continuous mapping, although additional or alternative information may be used to characterize areas of continuous mapping. A table-based resource mapping approach of this type can avoid the need for excessive occupancy testing to determine which REG positions already have been mapped in a previous stage, thereby substantially reducing processing time. This makes it easier to meet strict LTE latency requirements, while also reducing base station cost and power consumption.

In one embodiment, a base station transmitter in a wireless system comprises resource mapping circuitry configured to map symbols from multiple control channels to transmission symbols for transmission from the base station to user terminals. The resource mapping circuitry comprises a table-based mapper configured to receive the control channel symbols and to map those symbols to the transmission symbols utilizing at least a selected one of a plurality of tables providing respective distinct mappings between the control channel symbols and the transmission symbols. The resource mapping circuitry may further comprise a table generator configured to generate at least a subset of the plurality of tables, and such table generation may involve offline pre-computation and storage, although the table information may be obtained in a wide variety of other ways. Each of the transmission symbols may comprise a plurality of resource groups and the tables may specify distinct mappings of the control channels symbols to the resource groups for different sets of possible base station parameter values. The control channels may comprise, for example, downlink physical control channels such as the PCFICH, PDCCH and PHICH control channels, and the transmission symbols may comprise OFDM symbols.

As indicated previously, one or more of the tables may define areas of continuous mapping of symbols from a particular one of the control channels to resource groups of at least one of the transmission symbols.

At least a subset of the tables may be pre-computed and stored for respective sets of possible values of at least one frequently-changing parameter of the base station. Examples of frequently-changing parameters may include an indicator of usage of an extended cyclic prefix for one or more of the control channels, a specified number of resource groups for each of one or more of the transmission symbols, and an indicator of a number of transmission symbols utilized for mapping of at least a particular type of control channel. The latter indicator may comprise, for example, an indicator of a number of OFDM symbols utilized for PHICH mapping.

The resource mapping circuitry may further comprise table selection logic configured to select a particular one of the tables responsive to one or more current parameters of the base station, and a parameter change detector configured to detect changes in one or more current parameters of the base station. The parameter change detector may be operative to generate at least one output that is utilized to control updating of one or more of the tables responsive to detection of a change in at least one non-frequently-changing parameter of the base station. Examples of non-frequently-changing parameters of the base station may include a cell identifier and a number of downlink resources available for transmission.

DETAILED DESCRIPTION

Embodiments of the invention will be illustrated herein in conjunction with exemplary wireless systems which include one or more base stations each configured to communicate with multiple user terminals in a particular manner. It should be understood, however, that the disclosed techniques are more generally applicable to any wireless system application in which it is desirable to provide improved processing of PCFICH, PDCCH, PHICH channels or other types of control channels. For example, the invention can be implemented in a wide variety of other types of wireless systems, including systems outside of the LTE cellular context, such as WiMAX systems, Wi-Fi systems, etc.

Figure 1:
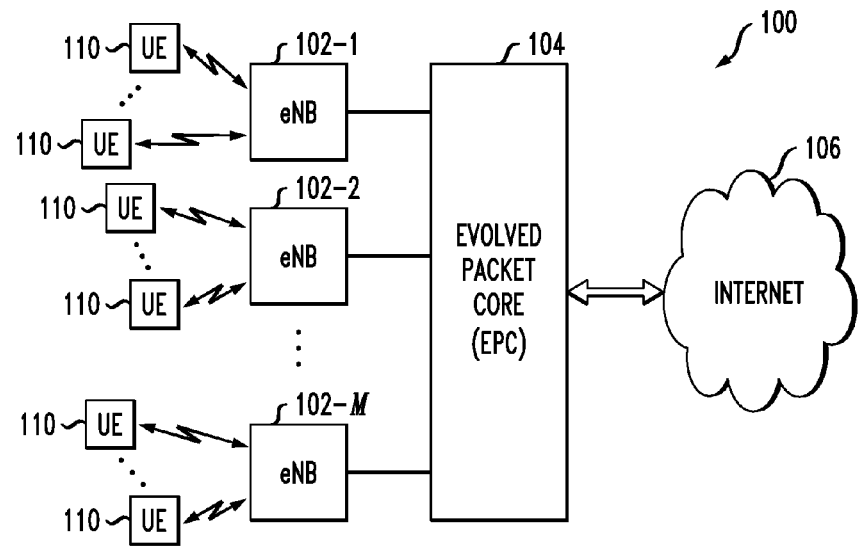
FIG. 1 is a block diagram showing an illustrative embodiment of a wireless system that incorporates table-based resource mapping for multiple downlink control channels.

FIG. 1 shows a wireless communication system 100 in an illustrative embodiment. The system 100 includes a plurality of base stations 102-1, 102-2, . . . 102-M, each arranged to communicate with multiple user terminals 110. It is assumed without limitation that the wireless system 100 comprises an LTE cellular system. The base stations 102 are therefore also referred to in this embodiment as respective evolved Node B (eNB) elements, and the user terminals 110 are also referred to as user equipment (UE). The base stations 102 are coupled to an evolved packet core (EPC) 104, which may include, for example, one or more conventional gateways and mobility management entities of a type well known in the art. The EPC 104 provides connectivity between the base stations 102 and one or more external networks, in this embodiment illustratively comprising Internet 106.

A given one of the user terminals 110 may comprise, by way of example, a mobile telephone, a computer, or any other type of user communication device. The term "user terminal" as used herein is therefore intended to be construed broadly, so as to encompass a variety of different types of mobile stations, subscriber stations or, more generally, communication devices.

It is to be appreciated that the system 100 as illustrated in FIG. 1 is just one exemplary configuration of a wireless system that may incorporate table-based resource mapping using the techniques disclosed herein, and numerous alternative configurations of system elements may be used in other embodiments. For example, other embodiments of the invention may include additional or alternative elements of a type commonly associated with conventional system implementations.

The base stations 102 and user terminals 110 in the system 100 communicate over uplink and downlink channels of the type specified in the 3GPP LTE standards documents, such as the above-cited 3GPP TS 36.211 document. These channels include at least one downlink control channel, and may more particularly include PCFICH, PDCCH and PHICH control channels. Embodiments of the invention configure one or more of the base stations 102 so as implement improved processing of PCFICH, PDCCH and PHICH channels. Such PCFICH, PDCCH and PHICH channels may be viewed as examples of what are more generally referred to herein as "control channels." In these embodiments, resource mapping for PCFICH, PDCCH and PHICH channels is modified relative to conventional arrangements, in a manner that substantially reduces processing time, thereby making it easier to meet strict LTE latency requirements, while also reducing base station cost and power consumption.

Figure 2:
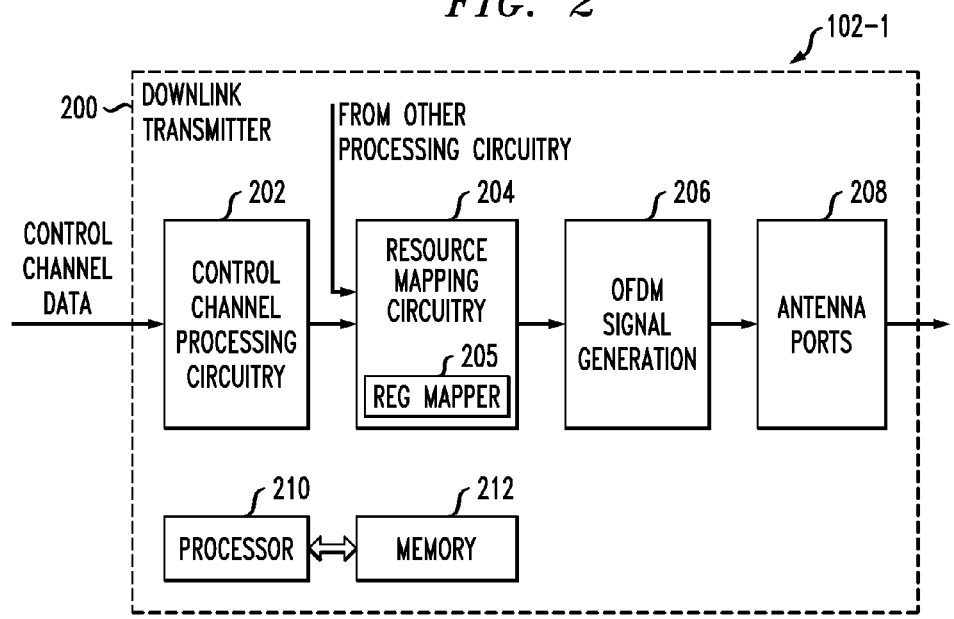
FIG. 2 shows a more detailed view of a portion of a base station transmitter of the FIG. 1 system.

FIG. 2 shows a downlink transmitter 200 in a particular one of the base stations 102-1. The transmitter 200 comprises control channel processing circuitry 202 for processing control channel data associated with the PCFICH, PDCCH and PHICH channels. The control channel processing circuitry 202 is coupled to resource mapping circuitry 204. One or more other base stations 102 may also be configured to include a similar downlink transmitter. Each of the base stations 102 may be further assumed to include additional uplink and downlink transceiver elements and related components of a conventional nature for supporting communications over other types of channels within the system 100.

The outputs of the control channel processing circuitry 202 in the present embodiment comprise symbols from the PCFICH, PDCCH and PHICH channels that are mapped to system transmission resources in resource mapping circuitry 204. More particularly, the control channel symbols are mapped to REG positions of OFDM symbols in a REG mapper module 205 implemented within the resource mapping circuitry 204. The resource mapping circuitry 204 may also map inputs for other downlink channels as received from other processing circuitry not specifically shown.

Based at least in part on the resource mapping process implemented in circuitry 204, corresponding OFDM signals are generated in OFDM signal generation module 206, and the resulting OFDM signals are applied to antenna ports 208 for transmission over an air interface of the system 100 to the user terminals 110. Such OFDM signal generation operations may be performed in a well-known conventional manner. In other embodiments, a variety of other techniques may be used to transmit control channel symbols between a base station and user terminals.

The term "resource mapping circuitry" as used herein is intended to be broadly construed, so as to encompass any type of circuitry that is configured to map symbols from multiple control channels to transmission symbols in a base station of a wireless system. The resource mapping circuitry 204 in the present embodiment implements in REG mapper 205 a table-based resource mapping process in which a plurality of tables are generated or otherwise obtained providing respective distinct mappings between the control channel symbols and the OFDM symbols, and the control channel symbols are mapped to the OFDM symbols using at least a selected one of the tables. The selection of a particular table or set of tables may be based, for example, on one or more current parameters of the base station. Such exemplary arrangements lead to significantly reduced processing time and therefore improved overall performance relative to the conventional PCFICH, PDCCH and PHICH resource mapping as set forth in the above-cited 3GPP TS 36.211 document. The downlink transmitter 200 further comprises a processor 210 coupled to a memory 212. At least a portion of the resource mapping circuitry 204 may be implemented as one or more processing modules, each comprising computer program code that is stored in the memory 212 and executed by the processor 210. The processor and memory elements of the transmitter 200 need not be dedicated exclusively to the transmitter 200 and accordingly may be shared with one or more other transmitters, receivers or other components of the base station 102-1. For example, these processor and memory elements may represent respective generalized processing and memory resources of the base station that perform operations for multiple base station components.

The processor 210 may comprise, for example, one or more microprocessors, application-specific integrated circuits (ASICs), field-programmable gate arrays (FPGAs), digital signal processors (DSPs), systems-on-chip (SOCs) or other types of processing devices, as well as portions or combinations of such elements.

The memory 212 may comprise, for example, electronic memory such as random access memory (RAM) or read-only memory (ROM), magnetic memory, optical memory or other types of storage elements, as well as portions or combinations of such elements. System memory elements such as memory 212 are considered examples of what are also referred to herein as computer-readable storage media that store computer program code, or more generally computer program products having executable program code embodied therein. Such program code when executed in the base station 102-1 of the wireless system 100 causes the base station to perform at least a portion of the functionality of the downlink transmitter 200, and more particularly to implement at least a portion of the table-based resource mapping functionality for the PCFICH, PDCCH and PHICH control channels. Thus, resource mapping circuitry as that term is used herein may encompass circuitry associated with processor 210 and memory 212.

An illustrative embodiment of the resource mapping circuitry 204 will now be described in greater detail with reference to FIG. 3. In this embodiment, the REG mapper 205 of the resource mapping circuitry 204 comprises a table generator 300 configured to generate a plurality of tables providing respective distinct mappings between the PCFICH, PDCCH and PHICH control channel symbols and the OFDM transmission symbols, and a table-based mapper 302 configured to receive the control channel symbols and to map those symbols to the transmission symbols utilizing at least a selected one of the tables. The REG mapper 205 further includes a table memory 304, a parameter change detector 305 and table selection logic 306. One or more of the REG mapper components 300, 302, 304, 305 and 306 may each be implemented at least in part utilizing processor 200 and memory 212 of the downlink transmitter 200.

It should be noted that, although the REG mapper 205 includes a table generator 300 in this embodiment, other embodiments can obtain the tables in a wide variety of other ways, such as by retrieving the tables substantially in their entirety from a memory or other system component that may be external to the downlink transmitter 200. In one or more of these other embodiments, the table generator may be eliminated in whole or in part, or may be incorporated at least in part into another system component that may be external to the downlink transmitter and possibly even external to the base station. Thus, for example, the tables may be computed or otherwise generated at least in part externally to the resource mapping circuitry 204, using offline pre-computation and storage or other techniques, and obtained as needed by the REG mapper 205. Numerous other techniques may be utilized to allow the resource mapping circuitry to obtain tables or related information from external components.

The term "table generator" as used herein is also intended to be broadly construed, and in one or more embodiments may encompass, for example, circuitry that populates existing tabular data structures with information retrieved from a memory. The resulting populated structures are considered "tables" as that term is broadly used herein. The tables used in a given embodiment therefore may have any of a number of different formats depending upon the particular mapping application. Also, updating of a given table is considered a type of table generation as the latter term is used herein.

In the present embodiment, each of the OFDM symbols is assumed to comprise a plurality of REGs with each such REG corresponding to a particular REG position within the OFDM symbol. For example, with reference to the exemplary mapping of FIG. 5, the horizontal axis denotes the OFDM symbol number and the vertical axis denotes the REG position number within each OFDM symbol. It is apparent from the FIG. 5 mapping that each OFDM symbol comprises multiple REGs, and that the size of the REGs may differ from OFDM symbol to OFDM symbol. The REGs of the OFDM symbols in this embodiment may be viewed as examples of what are more generally referred to herein as "resource groups," and other embodiments may perform table-based mapping utilizing resource groups other than REGs of an OFDM symbol.

The tables generated by the table generator 300 and stored in the table memory 304 in the present embodiment specify distinct mappings of control channel symbols to REG positions of the OFDM symbols for different sets of base station parameters. As noted above, one or more of the tables may be at least partially pre-computed. Thus, tables can be wholly or partially computed offline, before the mappings specified by those tables are actually needed by the table-based mapper 302. One or more of the tables may each define one or more areas of continuous mapping of symbols from a particular one of the control channels to REG positions of at least one of the OFDM symbols.

As a more particular example, the tables may be used to store information characterizing areas of continuous mappings for the PCFICH, PDCCH, PHICH control channels, such that for a given area of continuous mapping, symbols of the corresponding control channel are mapped continuously to the REG positions of one or more OFDM symbols. Each of the areas of continuous mapping may be described in one or more of the tables using information that may include a starting OFDM symbol as identified by its symbol number, a starting REG position in that symbol, and a total number of REG positions to be mapped for that area of continuous mapping. It is to be appreciated, however, that a wide variety of different types of additional or alternative information may be used to characterize areas of continuous mapping in other embodiments.

Tables or portions thereof that are pre-computed by table generator 300 may be stored in memory 304 for respective sets of possible values of at least one frequently-changing parameter of the base station, as will be described in more detail below in conjunction with the flow diagram of FIG. 4.

The table selection logic 306 is configured in the present embodiment to select a particular one of the tables responsive to one or more current parameters of the base station. Updating of the tables may be triggered by the parameter change detector 305, which is configured to detect changes in one or more current parameters of the base station. Thus, for example, if a current value of a particular parameter has changed by more than a specified amount relative to a previous value of that parameter, updating of the table may be triggered. In the present embodiment, the parameter change detector 305 is operative to generate at least one output that is utilized to control updating of one or more of the tables responsive to detection of a change in at least one non-frequently-changing parameter of the base station.

Accordingly, for a given set of one or more non-frequently-changing parameters of the base station, multiple tables may be generated and stored for different values of frequently-changing parameters of the base station, with a particular one of those tables being selected based on the current values of the frequently-changing parameters. When a significant change is detected by detector 305 in one of the non-frequently-changing parameters, one or more of the tables may be updated responsive to that change.

The frequently-changing parameters of the base station 102-1 in the present embodiment may comprise, by way of example, one or more of an indicator of usage of an extended cyclic prefix for one or more of the control channels, a specified number of REGs for each of one or more of the OFDM symbols, and an indicator of a number of OFDM symbols utilized for mapping of at least a particular type of control channel, such as an indicator of a number of OFDM symbols utilized for PHICH mapping.

As a more particular example, a frequently-changing parameter of the base station may comprise the variable Ng utilized in defining the number of PHICH groups, as described in Section 6.9 of the above-cited the above-cited 3GPP TS 36.211 document. The variable Ng has four possible values, namely, ⅙, ½, 1 and 2.

The non-frequently-changing parameters of the base station 102-1 in the present embodiment may comprise, again by way of example, at least one of a cell identifier (ID) and a number of downlink resources available for transmission. The latter may more particularly denote a number of downlink resource blocks.

In one possible implementation utilizing the parameters noted above, a set of five different base station parameters may be used to define the mappings, including the frequently-changing parameters of extended cyclic prefix usage indicator, PHICH grouping variable Ng, and indicator of number of OFDM symbols utilized for PHICH mapping, and the non-frequently-changing parameters of cell ID and number of downlink resource blocks, although numerous other combinations of these or other parameters are also possible. In this exemplary implementation, the three frequently-changing parameters each have a limited range of values. More specifically, the extended cyclic prefix indicator is binary and therefore has two possible values, PHICH grouping variable Ng has four possible values as previously noted, and the indicator of number of OFDM symbols utilized for PHICH mapping may be 1, 2 or 3. Thus, in this example there are 24 possible configurations based on the three frequently-changing parameters. Different tables or portions of tables may be associated with each of these 24 possible configurations, or alternatively with each of only a subset of the 24 possible configurations.

The outputs of the resource mapping circuitry 204 may be consistent with those specified by the above-cited 3GPP TS 36.211 document, but processing time in generating the outputs is significantly reduced relative to conventional arrangements. For example, the amount of processing time required in this embodiment is reduced at least in part because occupancy checking of REG positions can be avoided.

Figure 4:
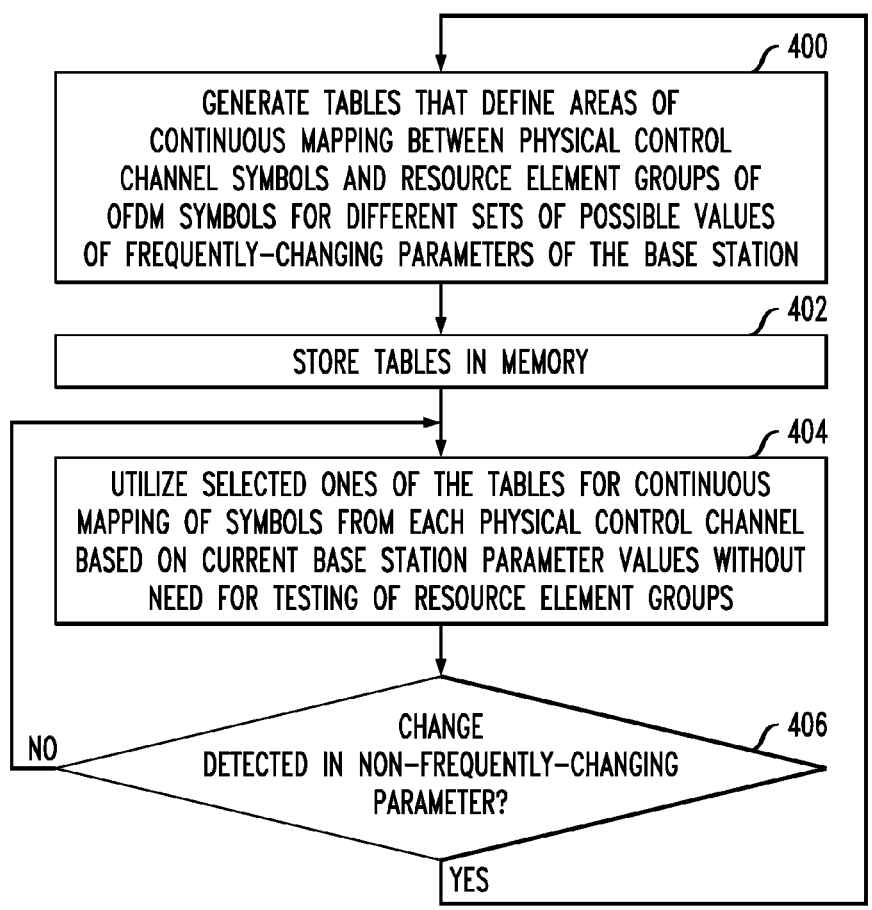
FIG. 4 is a flow diagram of a table-based resource mapping process that may be implemented using the resource mapping circuitry of FIG. 3.

Referring now to FIG. 4, a flow diagram illustrates a table-based mapping process implemented by the REG mapper 205 of the resource mapping circuitry 204. The process includes steps 400 through 406, at least a subset of which may be implemented at least in part utilizing software stored in memory 212 and executed by processor 210, or otherwise under processor control.

In step 400, tables are generated by table generator 300 that define areas of continuous mapping between control channel symbols and REGs of one or more of the OFDM symbols for different sets of possible values of frequently-changing parameters of the base station.

In step 402, the tables are stored in the table memory 304, which may represent a designated portion of the downlink transmitter memory 212 or a separate memory. As indicated previously, at least a subset of the tables may be pre-computed and stored. Other tables may be generated at least in part as needed by the table-based mapper 302. In step 404, selected ones of the tables are utilized for continuous mapping of symbols from each control channel based on current base station parameter values, without the need for occupancy testing of REG positions. The selection may be based on current values of frequently-changing parameters, as described above, and carried out under control of the table selection logic 306.

In step 406, a determination is made as to whether or not the parameter change detector 305 has detected a sufficiently significant change in one or more of the non-frequently changing parameters. This may involve, for example, comparing any detected changes in these parameters to specified thresholds. If a parameter change having a magnitude greater than the corresponding threshold is detected, the process returns to step 400 to update one or more of the tables using the table generator 300. Otherwise, the process returns to step 404 and the existing set of tables continues to be used without updating.

It is to be appreciated that the particular arrangement of process steps shown in FIG. 4 is presented by way of example only, and that additional or alternative steps, or other orderings of the process steps, may be used in other embodiments. For example, steps illustrated as being formed sequentially in FIG. 4 may be performed at least in part in parallel with one another in other embodiments.

In the FIG. 4 table-based resource mapping process, the PDCCH and PHICH channels each have their symbols mapped in batches to corresponding sets of REG positions of the OFDM symbols utilizing respective areas of continuous mapping as defined by the tables. Thus, each batch of PDCCH or PHICH symbols to be mapped to OFDM symbols is mapped in accordance with a specified area of continuous mapping, and without the need for performing occupancy tests on the associated REG positions. PCFICH symbols in the present embodiment may be mapped to REG positions of the OFDM symbols independently of and prior to the mapping of the PDCCH and PHICH channels.

Referring again to FIG. 5, an example is shown of a REG mapping resulting from application of the FIG. 4 process. As noted previously, the horizontal axis in FIG. 5 denotes the OFDM symbol number and the vertical axis denotes the REG position number within each OFDM symbol. Each OFDM symbol comprises multiple REGs, and the size of the REGs may differ from OFDM symbol to OFDM symbol. The number following the channel identifier in each REG position in FIG. 5 denotes the area of continuous mapping that was used. Thus, for the PHICH channel, two areas of continuous mapping are used, denoted PHICH 1 and PHICH 2, each comprising two REG positions in OFDM symbol 1. It should be noted that it is assumed in this example that the number of OFDM symbols utilized for PHICH mapping is 1.

For the PDCCH channel, three areas of continuous mapping are used, denoted PDCCH 1, PDCCH2 and PDCCH 3. The area of continuous mapping denoted PDCCH 1 comprises one REG position in OFDM symbol 1, and two REG positions in each of OFDM symbols 2 and 3. The area of continuous mapping denoted PDCCH 2 comprises seven REG positions in each of OFDM symbols 2 and 3. Finally, the area of continuous mapping denoted PDCCH 3 comprises two REG positions in OFDM symbol 1, and three REG positions in each of OFDM symbols 2 and 3.

Each of the areas of continuous mapping for the PHICH and PDCCH channels is described by at least a portion of at least one of the tables generated by table generator 300 and stored in table memory 304. Such tables generally indicate the positions and lengths of the areas of continuous mapping, and may indicate other information, such as the type, shape or layout of the area. In the present embodiment, all of the areas of continuous mapping comprise contiguous REG positions in one or more of the OFDM symbols.

The PCFICH channel in the present example is mapped without using table-based mapping, into a single REG position in OFDM symbol 1 as indicated by PCFICH 1.

Figure 5:
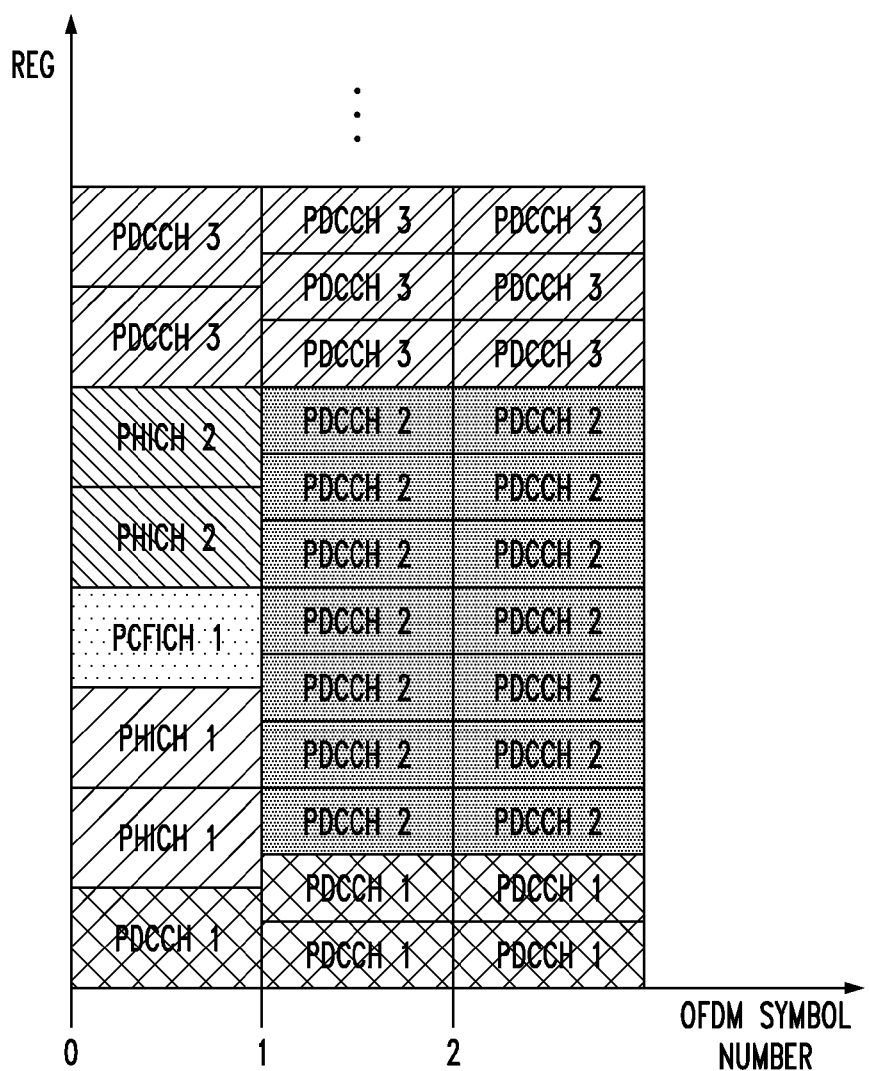
FIG. 5 shows one example of a table-based mapping of control channels to OFDM symbols determined using the process of FIG. 4.

It should be noted that the mapping shown in FIG. 5 is only an example, and in this particular example the PHICH channel symbols were restricted to one OFDM symbol while the PDCCH symbols spanned three OFDM symbols. However, numerous alternative mappings may be used, including mappings in which such restrictions or spannings do not apply.

Figure 3:
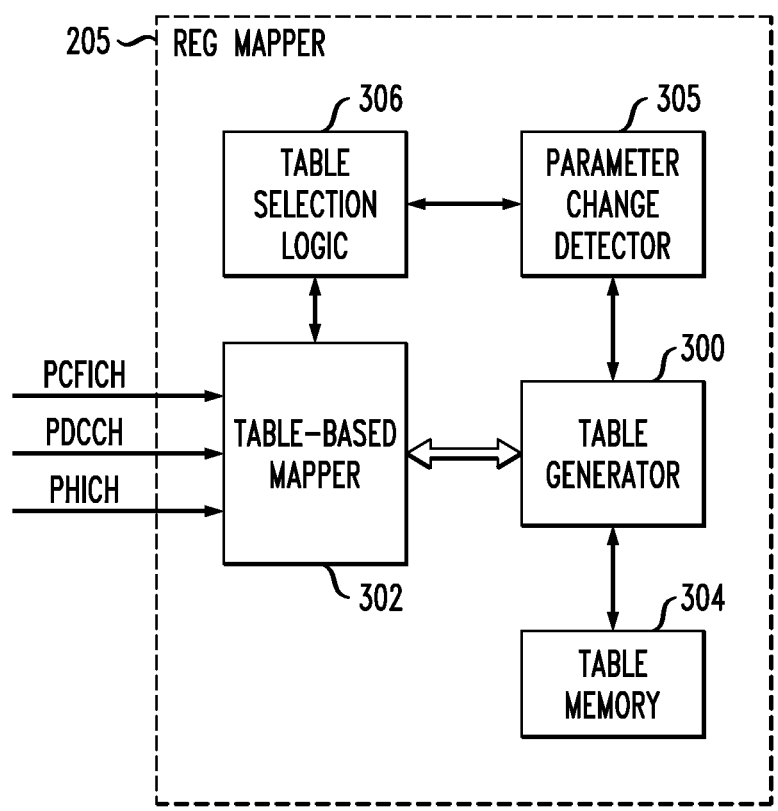
FIG. 3 illustrates one embodiment of resource mapping circuitry that may be implemented in the base station transmitter of FIG. 2.

Additional details regarding exemplary resource mapping operations that can be adapted for use in the embodiments of FIGS. 3 and 4 may be found in the above-cited 3GPP TS 36.211 document. Alternatively, other types of processing operations may be used to perform table-based resource mapping of the type disclosed herein.

The particular circuitry arrangements and associated processing operations as shown in FIGS. 3 and 4 may be varied in other embodiments. Numerous alternative arrangements of hardware, software and firmware in any combination may be used to implement the described table-based resource mapping functionality.

Also, although described primarily in the context of physical control channels in an LTE cellular system, the disclosed techniques can be adapted for use with a wide variety of other types of control channels used for communication between a base station and user terminals in a wireless system.

Resource mapping circuitry or portions thereof in accordance with embodiments of the invention may be implemented in the form of one or more integrated circuits suitable for installation within base station equipment. Thus, resource mapping circuitry 204 and its associated REG mapper 205 may be implemented in the form of an integrated circuit, or as a combination of multiple integrated circuits.

The term "transmitter" as used herein is intended to be broadly construed, so as to encompass, for example, resource mapping circuitry and one or more related elements such as control channel processing circuitry and OFDM signal generators. It may but need not encompass additional elements associated with downlink transmission of control channels, such as upconverters, filters, antennas, etc. A base station transmitter may therefore be implemented in the form of an integrated circuit.

In a given integrated circuit implementation, identical die are typically formed in a repeated pattern on a surface of a semiconductor wafer. Each die may include at least a portion of resource mapping circuitry as described herein, and may include other structures or circuits. The individual die are cut or diced from the wafer, then packaged as an integrated circuit. One skilled in the art would know how to dice wafers and package die to produce integrated circuits. Integrated circuits so manufactured are considered embodiments of the invention.

Again, it should be emphasized that the embodiments described herein are intended to be illustrative only. For example, the particular arrangement of base stations, user terminals, networks and other system elements as shown in FIG. 1 may be varied in alternative embodiments. Also, other types of circuitry elements or processing modules may be used to implement table-based resource mapping functionality as disclosed herein. These and numerous other alternative embodiments within the scope of the following claims will be readily apparent to those skilled in the art.

What is claimed is:

1. An apparatus comprising:
a transmitter comprising resource mapping circuitry configured to map symbols from multiple control channels to transmission symbols in a base station of a wireless system;
the resource mapping circuitry comprising:
a table-based mapper configured to receive the control channel symbols and to map those symbols to the transmission symbols utilizing at least a selected one of a plurality of tables providing respective distinct mappings between the control channel symbols and the transmission symbols.

2. The apparatus of claim 1 wherein the resource mapping circuitry further comprises a table generator configured to generate at least a subset of the plurality of tables providing respective distinct mappings between the control channel symbols and the transmission symbols.

3. The apparatus of claim 1 wherein the multiple control channels comprise two or more of a physical control format indicator channel (PCFICH), a physical downlink control channel (PDCCH), and a physical hybrid ARQ indicator channel (PHICH).

4. The apparatus of claim 1 wherein the transmission symbols comprise orthogonal frequency division multiplexed (OFDM) symbols.

5. The apparatus of claim 1 wherein each of the transmission symbols comprises a plurality of resource groups and the tables specify distinct mappings of symbols of the control channels to the resource groups for different sets of possible values of one or more base station parameters.

6. The apparatus of claim 1 wherein at least a subset of the tables are at least partially pre-computed.

7. The apparatus of claim 1 wherein at least a given one of the tables defines one or more areas of continuous mapping of symbols from a particular one of the control channels to resource groups of at least one of the transmission symbols.

8. The apparatus of claim 1 wherein at least a subset of the tables are pre-computed and stored for respective sets of possible values of at least one frequently-changing parameter of the base station.

9. The apparatus of claim 8 wherein the frequently-changing parameter comprises at least one of an indicator of usage of an extended cyclic prefix for one or more of the control channels, a specified number of resource groups for each of one or more of the transmission symbols, and an indicator of a number of transmission symbols utilized for mapping of at least a particular type of control channel.

10. The apparatus of claim 9 wherein the frequently-changing parameter comprises an indicator of a number of OFDM symbols utilized for PHICH mapping.

11. The apparatus of claim 1 wherein the resource mapping circuitry further comprises table selection logic configured to select a particular one of the tables responsive to a current value of at least one parameter of the base station.

12. The apparatus of claim 1 wherein the resource mapping circuitry further comprises a parameter change detector configured to detect a change in a current value of at least one parameter of the base station relative to a previous value of said at least one parameter.

13. The apparatus of claim 12 wherein the parameter change detector is operative to generate at least one output that is utilized to control updating of one or more of the tables responsive to detection of a change in a current value of at least one non-frequently-changing parameter of the base station relative to a previous value of said at least one non-frequently-changing parameter.

14. The apparatus of claim 13 wherein the non-frequently-changing parameter of the base station comprises at least one of a cell identifier and a number of downlink resources available for transmission.

15. An integrated circuit comprising the apparatus of claim 1.

16. A base station comprising the apparatus of claim 1.

17. The apparatus of claim 1 wherein the transmitter further comprises:
a processor; and
a memory coupled to the processor;
wherein at least a portion of the resource mapping circuitry is implemented as one or more processing modules each comprising computer program code that is stored in the memory and executed by the processor.

18. A method comprising:
obtaining a plurality of tables providing respective distinct mappings between control channel symbols and transmission symbols in a base station of a wireless system;
selecting at least a particular one of the plurality of tables; and
mapping the control channel symbols to the transmission symbols utilizing said selected at least one table,
wherein the above steps of obtaining, selecting, and mapping are performed by a processor.

19. The method of claim 18 wherein the obtaining step further comprises generating at least a subset of the plurality of tables providing respective distinct mappings between the control channel symbols and the transmission symbols.

20. The method of claim 18 wherein the selecting step further comprises selecting a particular one of the tables responsive to a current value of at least one parameter of the base station.

21. The method of claim 18 wherein the obtaining step further comprises updating one or more of the tables responsive to detection of a change in a current value of at least one parameter of the base station relative to a previous value of said at least one parameter.

22. A computer program product comprising a non-transitory computer readable storage medium having executable computer program code embodied therein, wherein the computer program code when executed in the base station of the wireless system causes the base station to perform the steps of the method of claim 18.

* * * * *

UNITED STATES PATENT AND TRADEMARK OFFICE
CERTIFICATE OF CORRECTION

PATENT NO. : 8,798,010 B2  
APPLICATION NO. : 13/362072  
DATED : August 5, 2014  
INVENTOR(S) : Kalfon et al.

Page 1 of 1

It is certified that error appears in the above-identified patent and that said Letters Patent is hereby corrected as shown below:

In the Specification

Column 5, line 64, after "processor" please change "200" to --210--

Signed and Sealed this  
Twenty-first Day of October, 2014

Michelle K. Lee  
*Deputy Director of the United States Patent and Trademark Office*